Oct. 23, 1951 G. N. SEXTON 2,572,062
COLLAPSIBLE SUCTION HOSE
Filed Feb. 3, 1947 2 SHEETS—SHEET 1
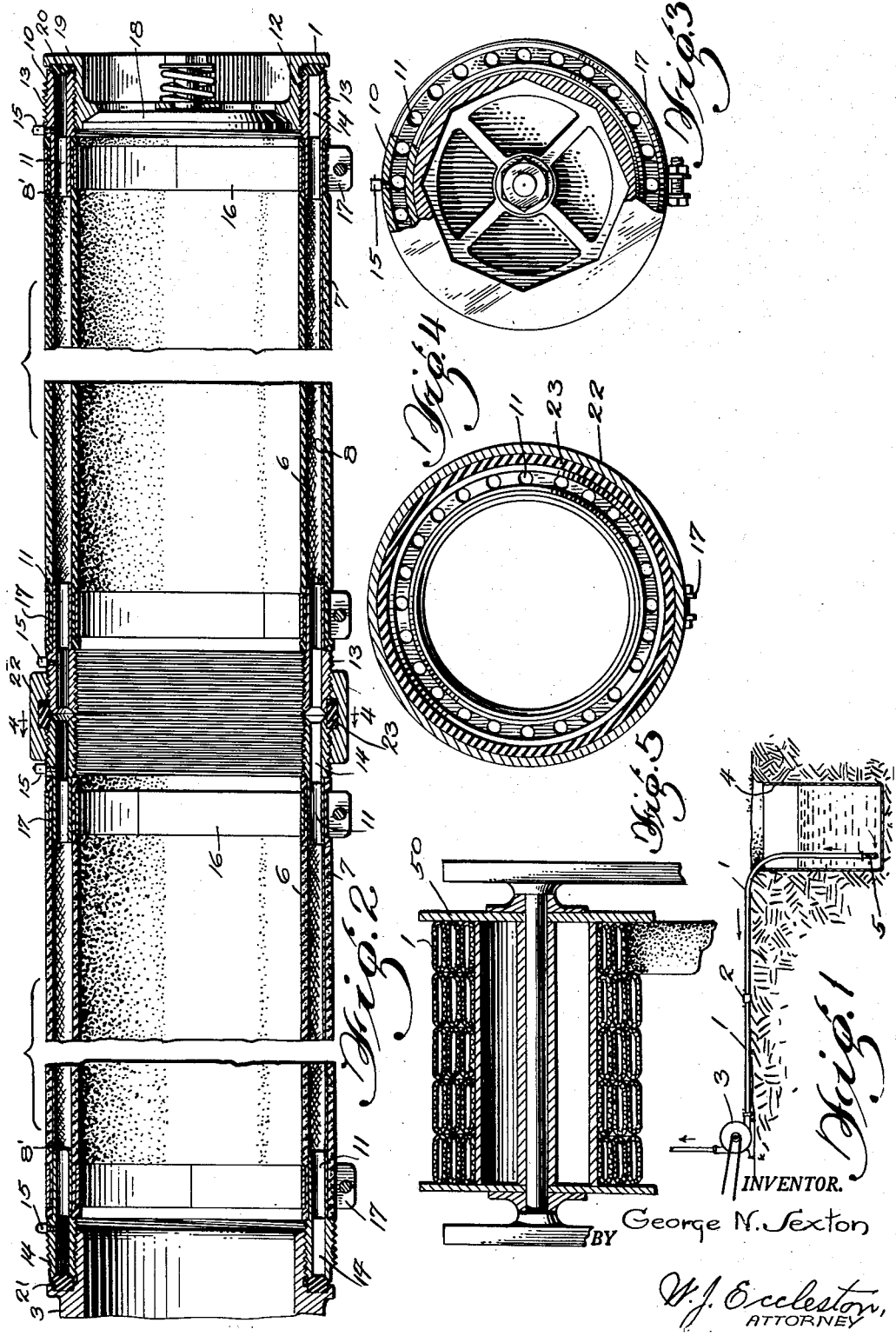
INVENTOR.
George N. Sexton
BY
W. J. Eccleston,
ATTORNEY

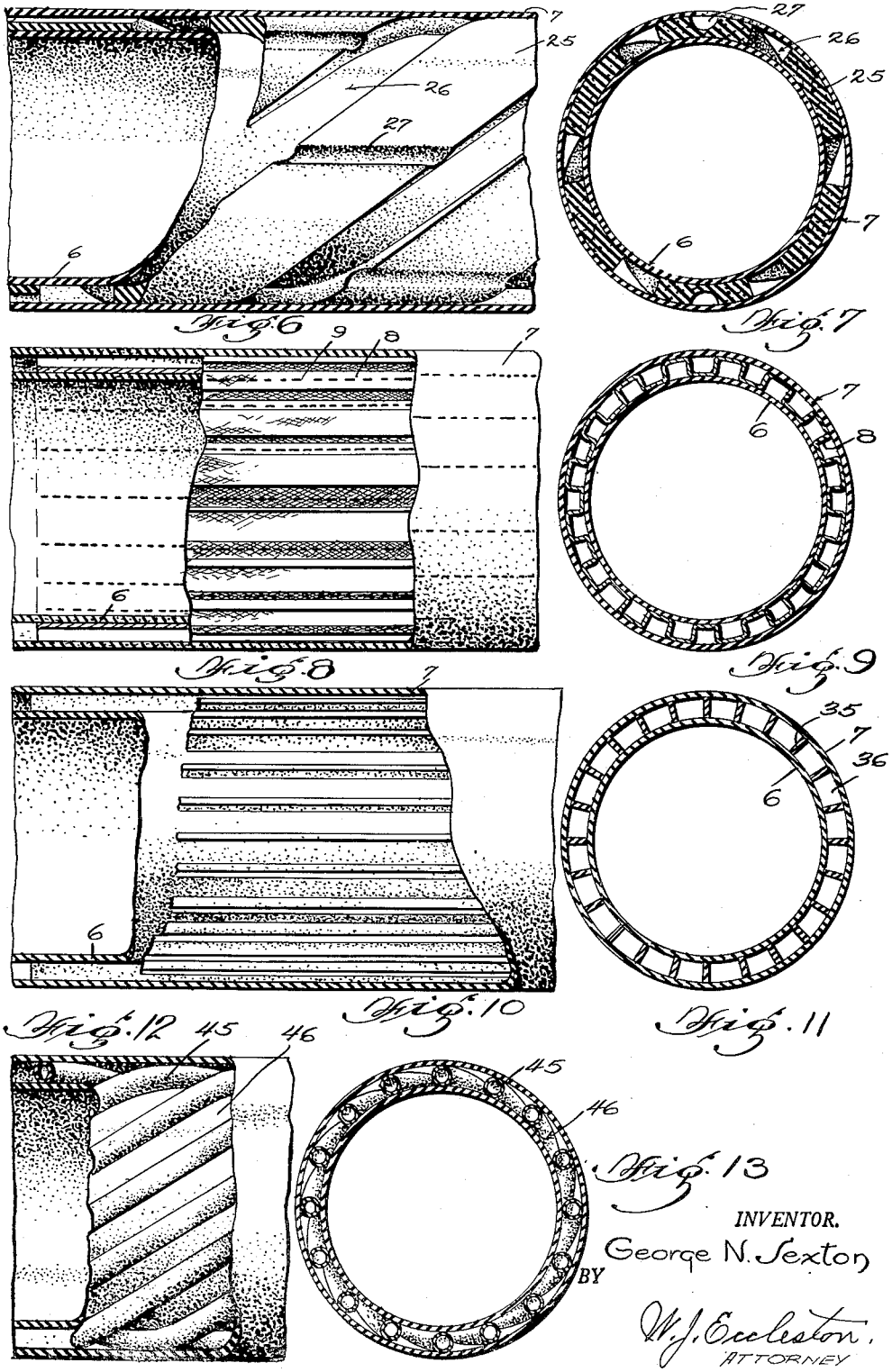

Patented Oct. 23, 1951

2,572,062

UNITED STATES PATENT OFFICE 2,572,062

COLLAPSIBLE SUCTION HOSE

George N. Sexton, Kensington, Md.

Application February 3, 1947, Serial No. 726,193

10 Claims. (Cl. 138—53)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a flexible hose and has for its primary object to provide a suction hose which may be readily collapsed for storage purposes and for handling prior to its being placed in use for suction purposes, and reeled for handling after such use.

A further object of the invention resides in the provision of a collapsible hose which may be easily and quickly distended laterally so as to permit it to be used for suction purposes and just as readily collapsed for handling and storage.

A further object of the invention consists in providing a collapsible suction hose in which the hose sections are so constructed that a plurality of sections may be simultaneously distended or collapsed when the sections are connected.

Another object of the invention resides in the use of a novel method of transporting fluids under subatmospheric pressure.

Other objects and advantages will be apparent from the following description when taken in connection with the accompanying drawings, in which:

Figure 1 is an elevational view of one form of the hose in association with a rotary pump and shown as withdrawing liquid from a tank.

Figure 2 is a longitudinal sectional view, partly broken away, through two coupled sections of the hose shown in Figure 1.

Figure 3 is a fragmentary end view of the valved end of the hose section shown in Figure 2.

Figure 4 is a transverse sectional view through the coupling, taken on line 4—4 of Figure 2.

Figure 5 is a sectional view through a conventional hose reel showing the hose collapsed and wound thereon.

Figure 6 is a fragmentary longitudinal sectional view of a modified form of collapsible hose.

Figure 7 is a transverse sectional view of the hose of Figure 6.

Figure 8 is a fragmentary detail view of the hose of Figure 2.

Figure 9 is a sectional view of the hose of Figure 8.

Figures 10 and 12 are fragmentary longitudinal sectional views of still further modified forms of collapsible hose, and Figures 11 and 13 are transverse sectional views of the forms of hose shown in Figures 10 and 12, respectively.

Referring to the drawings in more detail and particularly to Figures 1 to 4, inclusive, the numeral 1 indicates generally the sections of the novel collapsible suction hose. In Figures 1 and 2 two of these sections are shown as coupled together by a coupling 2, and one end of the hose is shown as connected to a rotary pump 3 while the other end is disposed in a tank 4 and provided with any suitable type of strainer 5.

Each collapsible hose section is composed of inner and outer tubes 6 and 7 which are concentrically arranged and spaced apart so as to provide an annular space throughout the length of the hose section. These tubes 6 and 7 may be connected together in various ways so as to provide a doubled wall unit, but in Figures 2, 8 and 9 the connecting means consists of a sheet of material 8 which is shown as zig-zagged back and forth across the annular space between the tubes and secured to the inner and outer walls of the tubes 7 and 6, respectively. The tubes 6 and 7 may be formed of rubber, rubberized fabric or other material capable of preventing the passage of air or liquid therethrough. The sheet, however, is preferably formed of a woven fabric capable of permitting the passage of air or liquid so as to expedite and readily equalize the inflation of the hose, as will appear hereinafter.

In securing the zig-zag sheet 8 within the space between the tubes 6 and 7, the sheet is preferably stitched to the tubes at the several points of contact as indicated by reference numeral 9 (Figure 8), and is thereafter vulcanized to the tubes. This construction provides not only a series of longitudinal passages in the space between the tubes but also securely joins the tubes together so as to provide a unitary construction and to maintain the tubes in substantially cylindrical shape when pressure fluid is introduced between them to impart rigidity to the hose.

The sheet 8 is of such length as to extend to a point spaced inwardly of each end of the hose as indicated by the numeral 8' in Figure 2. In the annular space left free at each end of the hose a combined header and coupling member is inserted. This member is shown in Figures 2, 3 and 4, and is generally indicated by reference numeral 10. The inner end of each member 10 is preferably of solid formation except for a plurality of openings 11, the number of which may correspond to the number of longitudinal channels formed in the doubled-wall hose and be aligned therewith. The other portion of the member 10 may be threaded interiorly and exteriorly as indicated by numerals 12 and 13, and is formed with an annular header portion 14 open at its outer end. Communicating with the interior of the header portion of the coupling at each end of the hose is a valve 15 adapted to admit pressure fluid into the interior of the header and thence through openings 11 to the longitudinal channels formed by the zig-zagged fabric 8, thereby imparting rigidity to the hose when used for suction purposes. Moreover, the pressure in the annular space between the inner and outer tubes reinforces the hose for use as a pressure hose in that the pressure between the walls compensates for a like amount of pressure on the interior of the hose, thereby permitting the use of higher pressures for a given strength of hose.

The combined coupling member and header 10 may be united to the hose by means of internal and external clamping rings 16 and 17 or any other suitable means for firmly securing the free ends of the inner and outer tubes to the inner portion of the coupling.

When the hose is to be used as a suction device an intake valve 18 may be mounted in the outer end of the hose and the valve casing or a cap is provided with an annular flange 19 and gasket 20 for closing the open end of the header 10. The header at the opposite end of the hose may be closed by a gasket 21 on the end of the intake manifold of the pump 3. If more than one hose section is required, they may be united by means of an exteriorly threaded ring 22 provided with a gasket 23 for sealing the joint between the two sections.

While the coupling members and other fixtures for the hose shown in Figures 2, 3 and 4 have been described in considerable detail, it is to be understood that any desired types of couplings and fixtures may be employed so long as they permit the passage of fluid from one section of hose to another.

One means of connecting the inner and outer tubes 6 and 7 has been described, namely, that shown in detail in Figures 8 and 9, however, a great variety of means may be employed for accomplishing the same result and several such means are shown in Figures 6, 7 and 10 to 13, inclusive. In Figures 6 and 7 strips of sponge rubber 25 or other similar material are spirally arranged between the tubes in spaced relation to provide spiral channels 26 and the outer faces of the strips are provided with transverse grooves 27 to allow the passage of pressure fluid from one channel 26 to another so as to expedite the inflation of the hose.

In the modification shown in Figures 10 and 11 radial fins 35 are employed to unite the inner and outer tubes 6 and 7 and provide longitudinal channels 36, while in Figures 12 and 13 spirally arranged tubes 45 are employed. These tubes provide spiral channels 46 and may be vulcanized to the tubes 6 and 7 as are the other forms of connecting means. In each of these various forms the connecting means stop short of the ends of the hose sections so as to permit the attachment of coupling members and headers and such members will, of course, be modified so as to adapt them to the particular interior construction of the hose wall.

Collapsible hose is, of course, well adapted to winding on a reel for storage purposes and Figure 5 discloses a reel 50 of any conventional type and a length of hose, embodying the present invention, compactly wound thereon.

From the foregoing description and the attached drawings, it will be apparent to those skilled in the art that I have devised a novel construction of collapsible hose; that it may be easily and quickly distended and rendered sufficiently rigid to permit its use as a suction hose; that it may be just as easily and quickly deflated to collapsed condition, and that it is substantially lighter, and consequently more readily manipulated, than suction hose heretofore in use.

I claim:

1. A collapsible suction hose composed of spaced inner and outer walls of flexible, fluid proof material, compressible means for connecting said walls throughout the length of the hose, and means for maintaining fluid under pressure in the space between said walls.

2. A collapsible suction hose composed of spaced inner and outer walls of flexible, fluid proof material, flexible means for connecting said walls throughout the length of the hose, and means for maintaining fluid under pressure in the space between said walls.

3. A collapsible suction hose composed of spaced inner and outer walls of flexible, fluid proof material, spirally arranged means for connecting said walls throughout the length of the hose, and means for maintaining fluid under pressure in the space between said walls.

4. A collapsible suction hose composed of spaced inner and outer walls of flexible, fluid proof material, a plurality of spirally arranged tubes of flexible material disposed in the space between said walls and connected to the latter, and means for maintaining fluid under pressure in and around said tubes.

5. A collapsible suction hose composed of spaced inner and outer walls of flexible, fluid proof material, spirally arranged strips of sponge rubber or the like mounted in the space between said walls and connected to the latter, and means for maintaining fluid under pressure in the space between said walls.

6. A collapsible suction hose composed of spaced inner and outer walls of flexible, fluid proof material, spirally arranged strips of material mounted in the space between said walls and connected to the latter, said material provided with transverse grooves to permit the passage of fluid longitudinally of the hose, and means for maintaining fluid under pressure in the space between said walls.

7. A collapsible suction hose composed of spaced inner and outer walls of flexible, fluid proof material, a sleeve of flexible material mounted in the space between said walls and provided with longitudinal corrugations connected to the inner and outer walls, and means for maintaining fluid under pressure in the space between said walls.

8. A collapsible suction hose composed of spaced inner and outer walls of flexible, fluid proof material, spacing means in the space between said walls and connected to the latter, said spacing means being constructed to provide channels extending lengthwise of the hose, a header at each end of said hose for providing communication between said channels, and a valve for admitting and maintaining fluid under pressure in said channels and headers and for releasing the same.

9. A collapsible suction hose composed of spaced inner and outer walls of flexible, fluid proof material, flexible means for connecting said walls throughout the length of the hose and arranged to provide channels extending lengthwise of the hose, headers for providing communication between the channels and a threaded fitting on each end of the hose.

10. A collapsible suction hose composed of spaced inner and outer walls of flexible, fluid proof material, a valve for admitting air into the space between said walls, couplings on each end of the hose, each of said couplings being provided with one or more apertures to permit the passage of fluid under pressure from the inflatable space of one hose section to that of another hose section when the sections are coupled together.

GEORGE N. SEXTON.

REFERENCES CITED

The following references are of record in the file of this patent:

UNITED STATES PATENTS

| Number | Name | Date |
|---|---|---|
| 497,535 | Cummings | May 16, 1893 |
| 583,819 | Rome | June 1, 1897 |
| 720,003 | Curtiss | Feb. 10, 1903 |
| 1,006,640 | Faget | Oct. 24, 1911 |
| 1,104,508 | Huthsing | July 21, 1914 |
| 1,220,661 | Many | Mar. 27, 1917 |
| 1,914,741 | Gysling | June 20, 1933 |
| 2,191,374 | Dixon | Feb. 20, 1940 |
| 2,206,737 | Tomsic | July 2, 1940 |
| 2,254,157 | Shaw | Aug. 26, 1941 |
| 2,273,393 | Couty | Feb. 17, 1942 |
| 2,322,937 | Holthouse | June 29, 1943 |

FOREIGN PATENTS

| Number | Country | Date |
|---|---|---|
| 15,917 | Great Britain | of 1899 |